US009487717B2

(12) United States Patent
Warnqvist

(10) Patent No.: US 9,487,717 B2
(45) Date of Patent: Nov. 8, 2016

(54) PROCESS FOR OBTAINING A DIESEL LIKE FUEL

(71) Applicant: Invico Tech AB, Brosarp (SE)

(72) Inventor: Jan Warnqvist, Vikbolandet (SE)

(73) Assignee: Invico Tech AB, Brösarp (SE)

( * ) Notice: Subject to any disclaimer, the term of this patent is extended or adjusted under 35 U.S.C. 154(b) by 30 days.

(21) Appl. No.: 14/362,807

(22) PCT Filed: Dec. 7, 2012

(86) PCT No.: PCT/EP2012/074768
§ 371 (c)(1),
(2) Date: Jun. 4, 2014

(87) PCT Pub. No.: WO2013/083768
PCT Pub. Date: Jun. 13, 2013

(65) Prior Publication Data
US 2014/0311018 A1  Oct. 23, 2014

(30) Foreign Application Priority Data

Dec. 8, 2011 (EP) .................................. 11192566
Mar. 15, 2012 (EP) .................................. 12159649

(51) Int. Cl.
| | |
|---|---|
| C09F 1/00 | (2006.01) |
| C09F 1/02 | (2006.01) |
| C09F 1/04 | (2006.01) |
| C10L 1/19 | (2006.01) |
| C10L 1/02 | (2006.01) |
| C11C 1/10 | (2006.01) |
| C11C 3/00 | (2006.01) |

(52) U.S. Cl.
CPC .................. *C10L 1/02* (2013.01); *C10L 1/026* (2013.01); *C11C 1/10* (2013.01); *C11C 3/003* (2013.01); *C10G 2300/1014* (2013.01); *C10G 2300/301* (2013.01); *C10G 2300/307* (2013.01); *Y02E 50/13* (2013.01); *Y02P 30/20* (2015.11)

(58) Field of Classification Search
CPC .............. B01D 11/04; B01D 11/0488; B01D 11/0492; B01D 11/00; C07C 7/10; C09F 1/00; C09F 1/02; C09F 1/04; C11B 1/00; C11B 13/005; C11C 1/00; C11C 4/00; H01L 51/5253; H01L 27/3244; H01L 2251/558
USPC ....... 530/200, 204, 206, 207, 230, 232, 233; 44/300
See application file for complete search history.

(56) References Cited

U.S. PATENT DOCUMENTS

| | | | | |
|---|---|---|---|---|
| 2,315,584 A | * | 4/1943 | Borglin ...................... | C09F 1/00 530/205 |
| 2,348,971 A | * | 5/1944 | Gayer ....................... | C09F 1/00 530/207 |
| 2,354,812 A | | 8/1944 | Jenkins | |
| 2,388,412 A | | 11/1945 | Hixson et al. | |
| 2,396,471 A | * | 3/1946 | Osterhof ................... | C09F 1/00 530/206 |
| 2,530,809 A | * | 11/1950 | Christenson ............. | B28D 1/00 530/205 |
| 2,575,013 A | * | 11/1951 | Hasselstrom ............. | C09F 1/00 530/208 |
| 3,177,196 A | | 4/1965 | Scheibel | |
| 3,510,468 A | * | 5/1970 | McManus, Jr. ........... | C09F 1/02 530/208 |
| 3,965,085 A | * | 6/1976 | Holmbom ............. | C11B 13/005 530/205 |
| 4,534,900 A | | 8/1985 | Cleary | |
| 7,695,532 B2 | * | 4/2010 | Chatterjee ................ | C10L 1/026 44/306 |
| 7,943,791 B2 | * | 5/2011 | McNeff .................... | C07C 67/03 554/124 |
| 2005/0197490 A1 | * | 9/2005 | Rojas ..................... | C11B 13/005 530/205 |
| 2007/0130820 A1 | * | 6/2007 | Chatterjee ................ | C10L 1/026 44/306 |
| 2009/0056201 A1 | * | 3/2009 | Morgan ................ | C11B 13/005 44/308 |
| 2009/0217573 A1 | * | 9/2009 | Stigsson ................. | C07C 67/08 44/388 |

FOREIGN PATENT DOCUMENTS

| | | |
|---|---|---|
| CA | 2319230 A1 | 3/2002 |
| CN | 101297024 A | 10/2008 |
| EP | 1568760 A1 | 8/2005 |
| JP | H1161093 A | 6/1989 |
| WO | 2007050030 A1 | 5/2007 |
| WO | WO-2008-099051 A2 | 8/2008 |
| WO | 2009011639 A2 | 1/2009 |
| WO | WO-2009-029344 A1 | 3/2009 |
| WO | 2009131510 A1 | 10/2009 |

OTHER PUBLICATIONS

ASTM Standfard D975 for Diesel Fuel (2011).*
ASTM Standard D6751 Spec. for Biodiel Fuel Blend Stock (2012).*
ASTM Biodiesel Specifications (2014).*
NREL Biodiesel Handling and Use (2009).*
ASTM Standard D975 for Diesel Fuel (2011).*
ASTM Standard D6751 Spec for Biodiesel Fuel Blend Stock (2012).*
International Search Report in International Application No. PCT/EP2012/074768, filed Dec. 7, 2012.
European Search Report in European Application No. 11192566.5, dated Mar. 9, 2012.
Keskin A. et al. "Usage of methyl ester of tall oil fatty acids and resinic acids as alternative diesel fuel" Energy Conversion and Management, Elsevier Science Publishers, Oxford, GB, vol. 51: 12, pp. 2863-2868. Dec. 1, 2010.

* cited by examiner

*Primary Examiner* — Pamela H Weiss
(74) *Attorney, Agent, or Firm* — Honigman Miller Schwartz and Cohn LLP

(57) ABSTRACT

Disclosed is an enrichment method for obtaining components for the production of a diesel like fuel additive or a diesel like fuel from crude tall oil. In the method, lipophilic components, being present in said crude tall oil, are extracted with an organic solvent and the resulting extract is washed with sulfuric acid and water.

20 Claims, No Drawings

PROCESS FOR OBTAINING A DIESEL LIKE FUEL

CROSS-REFERENCE TO RELATED APPLICATIONS

This application is the U.S. national stage application of International Patent Application No. PCT/EP2012/074768, filed Dec. 7, 2012, which claims priority to European Application Nos. 11192566.5, filed Dec. 8, 2011, and 12159649.8, filed Mar. 15, 2012, the disclosures of each of which are incorporated herein by reference in their entirety.

FIELD OF THE INVENTION

The invention relates to a method for obtaining an enriched material for obtaining a diesel like fuel or a diesel like fuel additive from crude tall oil and to such an enriched material. Further, the invention relates a diesel like fuel or a diesel like fuel additive and to method for obtaining such from crude tall oil.

SUMMARY

Due to the green-house effect and the fact the oil wells of the world eventually will run out, there is an interest in alternative renewable fuels throughout the world. As an example, bio-ethanol has been introduced as alternative to gasoline or as addition in gasoline to reduce or eliminate the contribution to the green-house effect.

Similarly, biodiesel, referring to a vegetable oil- or animal fat-based diesel fuel consisting of long-chain alkyl (methyl, propyl or ethyl) esters of fatty acids, has found use as an alternative or addition to petroleum diesel. Typically, biodiesel is made by transesterification of triglycerides, originating from a vegetable oil or animal fat feedstock, with an alcohol, such as methanol, giving fatty acid methyl esters (FAME:s) and glycerol. Although sodium and potassium methoxide commonly is used to produce alkyl esters of triglycerides, as methanol is the cheapest alcohol available, ethanol, as well as higher alcohols such as isopropanol and butanol, can be used to produce alkyl esters.

For every metric ton of biodiesel produced, approximately 100 kg of glycerol is obtained as by-product. Although there has been a market for the glycerol obtained, which assisted the economics of the process as a whole, the increase in global biodiesel production, has resulted in crash for the market price for crude aqueous glycerol. Nowadays, the production of glycerol thereby lowers the overall process economics.

A variety of plant and animal oils may be used to produce biodiesel. As common examples may be mentioned rapeseed and soybean oils, animal fats including tallow, lard, yellow grease, chicken fat, as wells as by-products of the production of Omega-3 fatty acids, and oil from halophytes, such as *Salicornia bigelovii*.

However, current worldwide production of vegetable oil and animal fat is not sufficient to replace liquid fossil fuel use. Furthermore, some object to the vast amount of farming and the resulting fertilization, pesticide use, and land use conversion that would be needed to produce the additional vegetable oil. There is thus a need for alternative sources for the production of raw materials suitable for further refinement to diesel engine fuel and fuel additives.

The European Union has also declared that fuel production from food crops is to be severely limited in the future. This statement is further suggesting that more renewable diesel engine fuel needs to come from non-food crops.

After the transesterification, biodiesel, unlike straight vegetable oil, has combustion properties similar to those of petroleum diesel. Thus, biodiesel may replace petroleum diesel in most current uses. Similar to ethanol used to replace gasoline, the effective heat value (approx. 37 MJ/kg) of biodiesel is about 9% lower than the heat value of petroleum diesel. Thus, biodiesel give rise to a lower fuel economy compared to petroleum diesel. Further, the engine performance (e.g. torque max and power max) of a diesel engine is typically lowered if biodiesel is used as fuel compared to petroleum diesel.

It would thus be of interest to find a renewable alternative to e.g. rape seed methyl esters not suffering from the above mentioned draw backs for use as a biofuel or as additive to petroleum diesel.

Keskinen et al (cf. Energy Conversion and Management 51 (2010) 2863-286) have reported the use of methyl esters of fatty acids and resinic acids (also denoted rosin acids within the art) obtained from tall oil, as additives to petroleum diesel. The fatty and resinic acids were obtained from tall oil by distillation in order to remove the unsaponifiables. Further, also others have reported the use of esters of fatty acids obtained from tall oil as additives to petroleum diesel. As an example, WO 2009/029344 discloses a process related to such use. In the disclosed process, tall oil obtained by extraction is distilled to obtain a distillate comprising fatty acids for subsequent esterification.

In U.S. Pat. No. 3,177,196 and U.S. Pat. No. 2,354,812, respectively, processes for fractioning of tall oil, i.e. separating fatty acids from retinoic acids and unsaponifiables, by extraction are disclosed. Similarly, U.S. Pat. No. 4,543,900 discloses a process for fractioning of tall oil, i.e. separating fatty acids from unsaponifiables, by extraction.

However, none of the disclosed processes of art overcomes the problem of the inherent lower fuel economy and engine performance of biodiesel based on FAME:s.

There are alternatives to transesterification of tri-glycerides within the art for the production of diesel like fuels from renewable plant based feedstocks. As an example, WO 2009/011639 discloses a process for manufacturing renewable diesel fuels from carboxylic acid rich organic material originating in plants, by treatment of said carboxylic acid rich material in at least three process stages; a) a distillation step under vacuum b) a decarboxylation step in the presence of an heterogeneous decarboxylation catalyst; c) a separation step wherein carbon dioxide is separated from the renewable diesel formed in step b). However, the distillation steps as well as the decarboxylation step are energy consuming. Furthermore, using temperatures exceeding 100° C., will initiate formation of (poly)aromatic hydrocarbons and polymerization.

Furthermore, WO 2009/131510 discloses a method for conversion of crude tall oil into diesel fuels. The disclosed method comprises the steps of: (a) removal of non-oil contaminants, including calcium, present in the crude tall oil thereby forming a refined tall oil stream; (b) removal of the volatile fraction of the refined tall oil stream; (c) separation of the volatiles free oil stream into two process streams, wherein the first process stream comprises components with boiling points, at atmospheric pressure, in the range of 170-400 degrees C.; and (d) lowering the oxygen content in the stream comprised of components with boiling points in the range 200-400 degrees C. WO 2009/131510 suffers from similar disadvantages as WO 2009/011639.

Although, fatty acids and rosin acids being present in crude tall oil may be separated from each other by the means of distillation, the fatty acids as well as the rosins acid will at least partly co-distill with neutral no-acidic components having similar boiling points. EP 1 568 760 discloses a process for refining crude tall oil overcoming said problem. In the disclosed process crude tall oil is saponified to form saponified crude tall oil comprising unsaponifiable matter, sodium or potassium soaps of fatty acids and rosin acids and water. The saponified crude tall oil is mixed with a liquid hydrocarbon. Subsequently, the formed hydrocarbon phase comprising unsaponifiable matter and being substantially free of water is separated from the formed aqueous phase comprising fatty acids and rosin acids substantially free of the hydrocarbons. By such a procedure the neutral no-acidic components, such as fatty alcohols, various hydrocarbon derivatives, such as squalene, docosanol, tetracosanol, sitosterol and sitostanol, being present in crude tall oil may be separated form the fatty acids and rosin acids. Subsequently to the separation of neutral no-acidic components, the fatty acids and rosin acids may be separated into one water free fraction comprising the fatty acids and one water free fraction comprising rosin acids.

Thus, there is need within the art for a process for obtaining an enriched material for obtaining a diesel like fuel or a diesel like fuel additive from renewable source.

SUMMARY

Consequently, the present invention seeks to mitigate, alleviate, eliminate or circumvent one or more of the above-identified deficiencies in the art and disadvantages singly or in any combination by providing an enrichment method for obtaining components for the production of a diesel like fuel additive or a diesel like fuel from crude tall oil. In such a method, lipophilic components present in crude tall oil are extracted with an organic solvent. Subsequently, the obtained organic extract, comprising lipophilic components, are washed with sulfuric acid. Thereafter, the acid washed organic extract is washed with water to obtain tall oil enriched in components for obtaining a diesel like fuel additive or a diesel like fuel.

A further aspect of the invention relates to a method for obtaining a diesel like fuel additive or a diesel like fuel from crude tall oil. In such a method, the hereinabove mentioned tall oil enriched in components for obtaining a diesel like fuel additive or a diesel like fuel is esterified with a C1-3 alkanol, whereby a diesel like fuel additive may be obtained. An even further aspect of the invention relates to a diesel like fuel additive obtainable by such a method.

A further aspect of the invention relates to a method for obtaining a diesel like fuel from crude tall oil. In such a method, tall oil enriched comprising in components for obtaining a diesel like fuel additive is obtained in a manner such that the tall oil enriched in components for obtaining a diesel like fuel additive comprises at least part of the organic solvent used to extract the lipophilic components. Subsequently, carboxylic acids, being present in the enriched tall oil, are esterified with a C1-3 alkanol, such as methanol, to obtain a diesel like fuel. An even further aspect of the invention relates to a diesel like fuel obtainable by such a method.

Further advantageous features of the invention are defined in the dependent claims. In addition, advantageous features of the invention are elaborated in embodiments disclosed herein.

DETAILED DESCRIPTION OF PREFERRED EMBODIMENTS

Crude tall oil (CTO) is obtained through acidification of black liquor soaps, being by-products of Kraft pulping of wood for obtaining cellulose. Kraft pulping consists of the digestion of wood chips at high temperature and pressure in diluted alkaline liquor containing sodium hydroxide and sodium sulfide as active ingredients. The digestion disrupts the cellular structure and causes the dissolution of lignin, other chemical products contained in the wood and hemicellulose. Thus, the cellulose fiber dispersed in the spent liquor from the digestion may be isolated by filtration. The reaming liquor, known as black liquor, is further evaporated and calcinated for the recovery of salts and alkalis, which return to the Kraft pulping process. After several stages of evaporation, the concentration of solids is around 30% and a portion of the solids, known as black liquor soaps, becomes insoluble and the insoluble portion is separated by skimming. The obtained skimmed pasty matter does typically have a water content between 30 and 50%.

Typically, black liquor soaps are transformed into crude tall oil by reacting the black liquor soaps with sulfuric acid, whereby fatty and rosin acid soaps are acidified into their corresponding free acids (fatty and rosin acids). Rosin acids are also denoted resin acids in the art. Upon addition of sulfuric acid the black liquor soaps are generally separated in three phases. The upper layer is denoted crude tall oil (CTO), and its main components are fatty and rosin acids, the major ones being diterpenic acids, such as abietic acid, dihydroabietic acid, and pimaric acid, unsaponifiable matter, including fatty alcohols, various hydrocarbon derivatives, such as squalene, and some suspended solids and water. The second layer or middle layer contains most of the lignin and insoluble solids originally present in black liquor soaps. The lower layer or brine is fundamentally composed of water and sodium sulfate and the sulfate is typically recovered. Crude tall oil typically consists of from 40 to 60 wt. % organic acids, including fatty and rosin acids, and 40-60 wt. % neutral substances. The crude tall oil typically also comprises sulphur, calcium, and sodium at 50 to 1100 ppm levels (weight).

While most of the various organic compounds being present in CTO in principle may find use as a feedstock for the production of fuels, CTO also comprises some organic compounds less suitable for the production of fuels. These organic compounds include aromatic compounds. Further, CTO also comprises various inorganic impurities, such as inorganic salts, like those from sodium, and calcium. In order to avoid excessive wear of the engine, the content of sodium, calcium, potassium, and magnesium, as wells as phosphorous compounds, in organic extracts for fuel applications, should be as low as possible.

As stated above, the properties of FAME differ from ones of petroleum diesel. Thus, FAME mainly has found use as an additive to petroleum diesel and for use in certain adapted engines. Further, fatty acids, being of the starting materials for the production of FAME, only constitute up to 50% of the total content of organic combustible compounds in CTO. Thus, only recovering the fatty acids implies a significant loss in yield in terms of using the combustible components of tall oil as efficient as possible.

The present inventors have surprisingly found that a diesel like, renewable fuel additive may be obtained from crude tall oil in high yields, by enriching the crude tall oil for fatty acids, as well as certain diesel like components, including middle range boiling diterpene like compounds, many of them unknown in the art, and subsequent esterification of the enriched tall oil. The esterified enriched tall oil has calculated net heat value close to the one of petroleum diesel and significantly higher than one of FAME.

Further, a relative high proportion, i.e. more than 30 wt %, of such a diesel like fuel additive may be blended with petroleum diesel without negatively affecting the combustion properties of the petroleum diesel or the engine performance. Without bond to any theory, it is believed that the diesel like components of tall oil, provide the diesel like fuel additive with properties compensating for the properties of the FAME:s in terms of engine performance and fuel economy (cf. Table 5 further below)

Furthermore, the enriched tall oil is produced in a manner consuming less energy than in the production of FAME from traditional sources e.g. rape seed, sunflower and soy bean oils. The herein disclosed method, is suitable for local production and consumption, e.g. in connection to pulp and paper milling, minimizing the carbon footprint compared to most biofuels through shorter transportation routes and less energy consuming processing.

Thus, an embodiment relates to an enrichment method for obtaining components for the production of a diesel like fuel or a diesel like fuel additive from crude tall oil.

In such a method, crude tall oil is provided. Typically, the crude tall oil is obtained through acidification of black liquor soaps, being by-products of Kraft pulping of wood for obtaining cellulose. Therefore, the provided crude tall oil is typically acidic. In the enrichment method, lipophilic components, including fatty acids, present in the crude tall oil are extracted with an organic solvent, whereby inorganic contaminations and hydrophilic organic contaminations are removed. Further, fatty acids, as well as certain diesel like components, including middle range boiling diterpene like compounds, are enriched. As already described, it seems that these diesel like components provide the diesel like fuel additive with properties compensating for the properties of the FAME:s in terms of engine performance and fuel economy.

The organic solvent used for the extraction is typically an organic solvent non-miscible with water, in order to allow for efficient extraction of lipophilic components and phase separation.

As the enriched material, due to the relative high iodine number, is heat sensitive, high temperatures should preferably be avoided in order to minimize polymerization.

Accordingly, solvents that may be removed under vacuum without applying high temperatures are preferred in embodiments, wherein the organic solvent is to be removed. In such embodiments, the organic solvent preferably has a boiling point of less than 120° C., such as less than 100° C., at atmospheric pressure. Preferred examples of such organic solvents are C5-C10, such as C6-8, linear, branched or cyclic hydrocarbons. Specific examples of preferred organic solvents include n-hexane, cyclohexane, and n-heptane.

In embodiments wherein the organic solvent not is to be removed, it preferably has a boiling point of at least 150° C., preferably at least 200° C. Preferred examples of such organic solvents are C10-C30, such as C10-C22, linear, branched or cyclic hydrocarbons or mixtures thereof. A specific example of a preferred organic solvent for use in such an embodiment is petroleum diesel. Petroleum diesel may be obtained via fractional distillation of crude oil between 200° C. and 350° C. at atmospheric pressure, resulting in a mixture of C8 to 21 hydrocarbons. By employing petroleum diesel as organic solvent, a diesel like fuel comprising fuel additives obtained via extraction of crude tall oil may be obtained.

In embodiments, wherein the fuel additive obtained via extraction of crude tall oil anyhow is to be used as additive for petroleum diesel, it is advantageous to employ petroleum diesel as organic solvent, as the need to evaporate the organic solvent then may be dispensed with, resulting in higher yields and fewer process steps. Further, problems associated with the purification of the evaporated organic solvent for recycling of it are them also eliminated. Organic solvents not be evaporated, are typically selected from organic solvents having a boiling point in the distillation range of petroleum diesel.

In extracting lipophilic components present in the crude tall oil, the crude tall oil and the organic solvent may be mixed in a weight ratio (crude tall oil:organic solvent) of 2:1 to 1:5, such as 1:1 to 1:2. Further, the crude tall oil may be extracted more than one time, such as 2 or 3 times. Use of more than one extraction is deemed to be more efficient than increasing the amount of organic solvent used in a single extraction. If extracted repeatedly, weight ratios of 2:1 to 1:5, such as 1:1 to 1:2, or 1:1, of crude tall oil:organic solvent may be used in each extraction step.

In order to facilitate phase separation, water as well as organic solvent may be added to the crude tall oil in extracting lipophilic components present in the crude tall oil. The weight ratio (crude tall oil:water) may be 1:1 to 10:1, such as 2:1 to 7:1, such 3:1 to 5:1. As the fatty acids are to be enriched in the organic solvent, the pH should be kept below 7 during the extraction. Thus, any water added during the extraction should preferably be neutral or acidic.

Furthermore, the process time could be shortened by applying centrifugal separation. However, also gravimetric separation could be used.

Subsequent to the extraction, the organic extract, or the combined organic extracts, is to be washed with sulfuric acid. The wash with sulfuric acid will cause precipitation and/or separation of some components from the organic extract. The precipitated and/or separated components are typically less suitable as diesel like fuel additives. As the present method typically does not comprise any distillation step, it is important to remove such components being less suitable as diesel like fuel additives Further, the wash with sulfuric acid may also cause sulfonation of certain components, such as mono, but especially polycyclic, aromatic components. Sulfonation will increase their water solubility, whereby they may be washed away. Also removal of aromatic components was found to be beneficial in terms of improving the usefulness of the extract as diesel like fuel additive.

In order to minimize the reaction of unsaturated fatty acids and rosin acids, being present in the organic extract, with the sulfuric acid, it is preferred to cool the organic extract prior to the wash with sulfuric acid. Thus, the organic extract may be cooled to between 0° C. and 10° C., such as to between 2° C. and 5° C. The organic extract may even be cooled to temperatures below 0° C. However, it is preferred to not cool the organic extract to a temperature below the melting point of the sulfuric acid.

Furthermore, it was noticed that cooling of the organic extract caused precipitation of some components. It is believed that these components may include high-boiling neutral substances. As removal of such components is believed to improve the cold properties of the final fuel additive, the cooled organic extract is, according to an embodiment, filtered prior to being washed with sulfuric acid.

In the wash of the organic extract, sulfuric acid comprising at least 90 wt % $H_2SO_4$, such as at least 95 wt. % $H_2SO_4$, may preferably be used in order to obtain efficient washing and sulfonation of aromatic components. Typically, concentrated sulfuric acid is used. Upon washing the organic extract, 2 to 20 wt. %, such as 5 to 15 wt. % sulfuric acid, may be added to the organic extract. Subsequent to adding sulfuric acid, the phases are mixed thoroughly; thereafter the washed organic extract is separated.

Subsequent, to the acid wash, the acid washed organic extract may be washed with water, thereby removing any $H_2SO_4$ remaining in the organic extract. The wash with water may typically be repeated until the pH of the wash water is 3 or above. Preferably, the wash with water is repeated until the pH the wash water is between 3.5 and 4.5. Further, the wash with water serve to improve the removal of slightly hydrophilic components still present in the organic phase, such as sulfonated aromatic components.

Subsequent, to the acid wash, before or after the wash with water, if performed, the washed organic extract may be cooled. Similar to what has been described above, cooling of the washed organic extract may cause precipitation of some components. As removal of such components is believed to improve the cold properties of the final fuel additive, the cooled organic extract may, according to an embodiment, be filtered and/or centrifuged to remove precipitated components. The washed organic extract may be cooled to a temperature of 10° C. or below, such as a temperature of 5° C. or below. While the washed organic extract may be cooled to a temperature between 10° C. and 0° C., such as to between 2° C. and 5° C. according to an embodiment, the organic extract may be even be cooled to temperatures below 0° C., according to an alternative embodiment. By cooling the organic extract to temperatures below 0° C., also water being present in the washed organic extract may be crystallized and precipitated.

According to an embodiment, the washed organic extract subsequently is evaporated under reduced pressure, thereby lowering, or even eliminating, the content of organic solvent and/or water in the organic extract. As water may lower the yield in the subsequent esterification, water being a side product in the esterification, it is advantageous to reduce the water content of the organic content as much as possible, such as below 800 ppm. The water content may also, as known to skilled person, be reduced by applying drying agents, such as molecular sieves.

Further, although the organic solvent in principle could form part of the fuel additive, the solvent may also be evaporated to allow for recycling of it. The evaporated solvent may be re-used directly, or it may be purified, such as by distillation, before being reused. If organic solvent having a boiling point of less than 150° C., such as less than 120° C. or less than 100° C., is used, it is preferred to evaporate the solvent as its boiling point is distinct from the distillation range of petroleum diesel.

As already described, the organic solvent is not to be evaporated according to some embodiments, but to form part of a diesel like fuel comprising lipophilic components extracted from crude tall oil. In such embodiments, water present in the washed organic extract may anyhow preferably be evaporated. Organic solvents not to be evaporated are typically selected from organic solvents having a boiling point in the distillation range of petroleum diesel. As already explained, a preferred example of such an organic solvent is petroleum diesel.

As the organic extract has a relative high iodine number, it is heat sensitive. Thus, high temperatures should preferably be avoided in handling the organic extract. Further, use of high temperatures is energy consuming, thus affecting the overall economy of the process. According to an embodiment, the method may be designed in such a way that the temperature of the crude tall oil, and extracts thereof, does not exceed 80° C. in any step of the method.

By avoiding high temperatures in the method, formation of high boiling adducts, such as polymeric and polyaromatic adducts, may be avoided. Thus, the need to distill the product, in order to reduce or eliminate the content of such adducts, before being used as a diesel like fuel or a diesel like fuel additive, may be dispensed with. Further, the acid wash is believed to remove polymeric and polyaromatic adducts originally present in the crude tall oil. In contrast to such polymeric and polyaromatic adducts, there is no need to separate high-boiling components present in the crude tall oil, from the organic extract.

In order to reduce the acid number of the washed organic extract, i.e. tall oil enriched in components for obtaining a diesel like fuel or a diesel like fuel additive, and to lower the boiling point of fatty acids therein, carboxylic acids, typically fatty acids, but also possibly rosin acids, of the washed organic extract may be esterified with a C1-3 alkanol, such as methanol. In addition to reduce the acid number of the washed organic extract and lower the boiling point of fatty acids therein, the esterification will reduce the viscosity of the washed organic extract.

As the washed organic extract typically is to be employed as diesel like fuel or diesel like fuel additive, the carboxylic acids in the washed organic extract may be esterified by adding a C1-3 alkanol and a catalyst to the washed organic extract. Preferably the carboxylic acids are esterified at elevated temperature, such as at temperature of 59 to 65° C. Thus, the organic extract may be heated prior to addition of the C1-3 alkanol. Preferably, the catalyst is selected among strong acids, which may be removed by conventional methods, such as filtration, distillation, or extraction, subsequent to the esterification. As an example, the catalyst may be concentrated sulfuric acid. Further, the catalyst may be a sulfonic acid resin.

Subsequent to the addition of the C1-3 alkanol and the catalyst, the reaction mixture may be heated, such as to 59-65° C. The reaction mixture may be heated for sufficient time to establish equilibrium. As an example, the reaction mixture may be heated for 3-5 hours.

As the esterification is an equilibrium process, molar excess of the C1-3 alkanol may be used. Typically, C1-3 alkanol may be added in a weight ratio (washed organic extract:C1-3 alkanol) of 1:1 to 1:5, such 1:1 to 1:2. The catalyst may be added to the C1-3 alkanol before being added to the washed organic extract. As an example, 0.5 to 5 wt %, such 1 to 2 wt %, e.g. about 1 wt. %, concentrated sulfuric acid may be added to the C1-3 alkanol before being added to the washed organic extract.

Subsequent to the esterification, the esterified organic extract may be washed with water, whereby any excess of methanol and the catalyst may be removed. Remaining methanol and water may be removed by evaporation under reduced pressure. Similar, to what have been described above, it is preferred if the method is designed to avoid heating the organic extract to temperatures above 80° C. in any step.

By such a method that has been described, a diesel like fuel, or a diesel like fuel additive being suitable for addition to petroleum diesel, may be produced in high yields, such as in a yield (mass) of 50 to 75%, from crude tall oil. Further the need for energy consuming distillation steps, lowering the overall process economy, may be dispensed with. Importantly, the obtained diesel like fuel, or a diesel like fuel additive, will not lower the fuel economy or the engine performance compared to petroleum diesel.

Further embodiments thus relates to a method for obtaining a diesel like fuel additive from crude tall oil and to a method for obtaining a diesel like fuel from crude tall oil. Such methods comprise an esterification step.

The obtained fuel additive or diesel like fuel comprises a complex mixture of components enriched from crude tall oil, of which some have been esterified. An embodiment relates to diesel like fuel additive obtainable by such methods as described herein.

Such a diesel like fuel additive may have one or several of the following properties:
- a iodine number according to SS-EN 14111 of at least 170;
- comprise between 40 wt % and 60 wt % of components other than fatty acids, methyl esters of fatty acids, rosin acids and methyl esters of rosin acids;
- an acid number according to SS-EN 14104 of not more than 100, such as not more than 80;
- a heat value of at least 39 MJ/kg, according to Boie (cf. Data och Diagram; Mörstedt/Hellsten 1994 ISBN 01-634-0876-7); and
- a density in the range of 930 to 960 kg/m$^3$ at 15° C.

The obtained fuel additive or diesel like fuel comprises a complex mixture of components enriched from crude tall oil, of which some have been esterified. An embodiment relates to diesel like fuel obtainable by such methods as described herein. The content of the organic solvent used to extract the lipophilic components, e.g. petroleum diesel, in the diesel like fuel obtainable by such methods as described herein may be 10 to 95, such as 40 to 80, wt %

Such a diesel like fuel may have one or several of the following properties:
- a cetane number according to EN 15159 of at least 50
- a distillation range according to ASTM D7169, wherein the lower end point of the distillation range is in the interval 160-190° C. and the upper end point of the distillation range is in the interval 380 to 420° C.;
- a cold filter clogging point according to EN 116 –20° C. or less.

Although, the washed organic extract may be esterified to obtain a diesel like fuel or a diesel like fuel additive, it may be used in other types of processes as well. As example, the washed organic extract is deemed to be useful as an alternative feedstock for decarboxylation in such a process as described in WO 2009/131510 or for reformation in a petroleum refinery. Furthermore, the organic extract is suited for further treatment (with hydrogen etc.) to obtain a product very similar to standardized petroleum diesel fuel, as it is of very high purity with very low levels of inorganic and organic impurities and as it has suitable boiling range.

One embodiment thus relates to use of the washed organic extract, or the esterified organic extract, as starting material for reformation in a petroleum refinery.

Without further elaboration, it is believed that one skilled in the art can, using the preceding description, utilize the present invention to its fullest extent. The preferred specific embodiments described herein are therefore to be construed as merely illustrative and not limitative of the remainder of the description in any way whatsoever. Further, although the present invention has been described above with reference to specific embodiments, it is not intended to be limited to the specific form set forth herein. Rather, the invention is limited only by the accompanying claims and, other embodiments than the specific above are equally possible within the scope of these appended claims, e.g. different than those described above.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous.

In addition, singular references do not exclude a plurality. The terms "a", "an", "first", "second" etc do not preclude a plurality.

EXPERIMENTAL

The following examples are mere examples and should by no mean be interpreted to limit the scope of the invention. Rather, the invention is limited only by the accompanying claims.

Example 1

Crude Tall Oil

The crude tall oil was produced through the Kraft process.
Extraction with Organic Solvent
The extraction steps were carried out with n-hexane and heptane, respectively. Three different weight ratios of organic solvent:CTO (1:1, 1.5:1, and 2:1) were used for the extraction. CTO was weighed into the separation funnel, whereafter the solvent was added to the CTO. Subsequently, the funnel was shaken vigorously for one minute. The funnel was then placed in an upright position allowing its content to separate for 2 hours. The upper, lipid, phase was then decanted from the lower non-lipid phase to obtain enriched tall oil.
Wash with Sulfuric Acid
Subsequent to the extraction step, the enriched tall oil was washed with sulfuric acid. Before the addition of sulfuric acid, the enriched tall oil was cooled to 5° C. Upon cooling of the organic phase, high-boiling neutral substances did crystallize. Precipitated material was removed by filtration prior to the addition of sulfuric acid. Once filtered, concentrated sulfuric acid (>95 wt. % $H_2SO_4$) was added to the enriched tall oil and the resulting mixture was stirred by an electric stirrer. The temperature was kept at 5° C. during the washing step. After stirring for 1 hour, the washed enriched tall oil was separated by decanting it from the acid phase and any precipitated matter to obtain an acid washed, enriched tall oil.
Wash with Water
The acid washed, enriched tall oil was transferred to a separation funnel, and washed with ordinary tap water in an oil:water ratio of 1:0.5 (w/w). The acid washed, enriched tall oil was repeatedly washed until the water phase had a pH exceeding 3.5 (typically 3 to 4 times), to obtain purified enriched tall oil.
Crystallization
It had been observed that the content of solid substances, e.g. crystals of dihydroabietic acid, abietic acid, sitosterol and its esters etc, did influence the viscosity of the enriched oil. In order to lower the content of such compounds, and thereby lower the viscosity of the enriched oil, the extracted oil phases were cooled and filtered, as indicated above, prior to the wash with sulfuric acid.

Further, the purified enriched oil was also cooled, typically to 5° C., and filtered subsequent to the water wash step.

In order to facilitate the filtration, part of the formed crystals were collected by gravimetric separation prior to filtration.

Evaporation

In order to allow for recycling of the organic solvent, as well lowering the water content of the purified enriched oil from the crystallisation step, the purified enriched oil was evaporated under reduced pressure (0.1 bar) at an elevated temperature not exceeding 80° C. to provide evaporated purified enriched tall oil. The water content was typically reduced below 800 ppm in order to facilitate the subsequent esterification.

In Table 1, the yield using heptane as organic solvent are given after the various steps.

TABLE 1

| | Proportions solvent:CTO | | |
|---|---|---|---|
| | 1:1 | 1.5:1 | 2:1 |
| CTO g | 800 | 663.5 | 540 |
| Heptane g | 800 | 995.3 | 1080 |
| Yield of non-lipid phase after extraction g (% by mass) | 172 (10.8) | 185.8 (9.7) | 99 (6.1) |
| Yield of enriched tall oil after the extraction g (% by mass) | 1428 (89.2) | 1473 (88.8) | 1521 (93.9) |
| Yield of sedimented phase as a result of the acid wash g (% by mass) | 833 (52.1) | 210 (12.7) | 355 (21.9) |
| Yield of purified enriched tall oil after evaporation g (% by mass) | 364 (45.5) | 371 (56) | 350 (65) |

It was concluded that a weight ratio of 1.5:1 seemingly was the most efficient, as far as quality and yield were concerned, taken the time- and effort-consuming handling with solvent into account.

It was observed that the higher the proportion of solvent the higher the yield of purified enriched oil. Further, it was observed that the process time could be diminished by centrifugal instead of gravimetric separation.

In table 2 below, the yield of evaporated purified enriched tall oil, the water content in the evaporated purified enriched tall oil, and the acid value in the evaporated purified enriched tall oil, wherein heptane in a 1:1-weight ratio has been used in the extraction step, for various amounts of sulfuric acid in the acid wash step, are given

TABLE 2

| Amount of sulfuric acid (wt. %) | Yield of enriched tall oil (% by mass) | Water content in the enriched tall oil (ppm) | Yield of sediment in the acid wash (% by mass) | Mineral acid related acid value in the enriched tall oil (mg KOH/g) | Organic acid-related acid value in the enriched tall oil (mg KOH/g) |
|---|---|---|---|---|---|
| 0 | 0 | — | 0 | 1.1 | 128.8 |
| 2 | 101 | — | 0 | 5.7 | 109.5 |
| 3 | 103 | — | 7.2 | 3 | 134.3 |
| 4 | 83 | — | 15 | 3.6 | 121.2 |
| 6 | 61 | 3600 | 44.8 | 1.3 | 118.9 |
| 10 | 45 | 1700 | 55 | 1.3 | 128.7 |
| 12 | 27 | 1100 | 56 | 1.6 | 117.5 |
| 14 | 35 | — | 78 | 1.8 | 115.7 |

As seen from table 2, that the amount of sulfuric acid added was determining, not only for the recovered quantity of purified oil, but also for the water content of the oil along with amount of sedimented material. Further, it can be seen that the acid wash only had a minor influence on the organic acid-related acid value, indicating that the fatty acids and the rosin acids not were affected by the acid wash.

Esterification

Carboxylic acids, and especially fatty acids, of the evaporated purified enriched tall oil were to be esterified with methanol. Thus, the purified evaporated enriched tall oil was heated to 59 to 65° C. Subsequently, methanol comprising 1 wt % concentrated sulfuric acid was added to the heated evaporated enriched tall oil. Methanol was added in a weight ratio of 2:1, in relation to the molar weight of oleic acid, C18:1, with the results of the acid and/or saponification number determinations as given values, and the resulting reaction mixture was heated to 59 to 65° C. for 3 to 5 hours. Thereafter, the resulting mixture was washed with water and evaporated to obtain esterified enriched tall oil.

In table 3 below, representative parameters of the obtained esterified enriched tall oil are compared to the corresponding parameters for petroleum diesel and FAME.

TABLE 3

| Property | Petroleum diesel | FAME | Esterified enriched tall oil |
|---|---|---|---|
| Flash point | >65° C. | >100° C. | >100° C. |
| Density kg/m$^3$ | 810-950 | 800-900 | 940-950 |
| Fatty acid methyl esters % (w/w) | 0 | Min 96.5 | 40-60 |
| Neutrals[1] wt. % | 100 | 0 | 40-60 |
| Distillation range (90%) | 180-370° C. | 300-360° C. | 310-410° C. |
| Alkali metal content (K + Na mg/kg) | Not regulated | Max 10 | Max 10 |
| Earth metal content (Ca + Mg mg/kg) | Not regulated | Max 10 | Max 10 |
| Calculated net heat value MJ/kg | 42-44 | 37-38 | 40-41 |

[1] e.g. hydrocarbons and free alcohols

As seen from table 3, the net heat value of the esterified enriched tall oil is significantly higher than the one of FAME. Further, other relevant parameters are similar. Hence, esterified enriched tall oil is deemed to be a suitable additive to petroleum diesel having a higher net heat value than FAME.

A blend of 31 wt % esterified enriched tall oil and 69 wt % petroleum diesel, comprising 5 wt % FAME, gave a diesel like fuel having cetane number of 50 according to EN ISO 5165, a viscosity of 3.5 cSt, according to ASTM D 445, and a flash point of 63.5° C., according to EN ISO 3679, thus confirming that the esterified enriched tall oil is suitable as diesel like fuel additive to petroleum diesel.

Further, the esterified enriched tall oil (31 wt %) and an ordinary diesel engine fuel (69 wt %), Mk1 from Swedish commercial grade, were blended. The resulting fuel blend was combusted in a diesel fuel engine, Chevrolet Duramax 6, 2 L V8 mounted in a test rig equipped with a water break system. Some vital parameters were logged during the test comparing to data supplied from a similar test with ordinary diesel engine fuel. The test generated the following data (cf. Table 4).

TABLE 4

| Parameter | Diesel fuel Mk1 with added enriched tall oil (31 wt %) | Diesel fuel Mk 1 commercial grade |
|---|---|---|
| Torque max (Nm) | 930 | 911 |
| Power max (hp) | 457 | 448 |
| Cylinder peak pressure max (bar) | 183 | 183 |
| Lambda value | 1.55 | 1.46 |

As can been seen from table 4, addition of as much as 31 wt % enriched tall oil to a commercial diesel fuel, resulted in a blended fuel at least comparable, in terms of maximum engine effect, and even apparently improved, to commercial diesel. Blending of such a high proportion of FAME or vegetable oil to a commercial diesel fuel would result in reduced engine effect (cf. Table 5 below). Accordingly, the enriched tall oil obtainable via the enrichment method disclosed herein is far better renewable fuel additive than FAME.

In table 5 below the engine performance of petroleum diesel is compared to the engine performance petroleum diesel blended with vegetable oils and FAME, respectively. Petroleum diesel has been given an index of 100 in order to allow for comparison.

TABLE 5

| Parameter | Diesel fuel Mk1 with 31% added enriched tall oil | Diesel fuel Mk1 commercial grade | Diesel fuel Mk1 with 33% added rape seed oil [1] | Diesel fuel with 30% added sunflower oil [2] | Diesel fuel with 30% added canola methyl ester [3] | Diesel fuel with 20% added jatropha methyl ester [4] | Diesel fuel with added soy bean methyl ester 30% [5] |
|---|---|---|---|---|---|---|---|
| Torque max | 102 | 100 | 98.7 | 99.8 | 97.8 | 97.5 | 99.1 |
| Power max | 102 | 100 | 98.7 | 99.8 | 97.8 | 97.5 | 99.2 |

[1] SP Technical Research Institute of Sweden, 1987, Message 3106
[2] Kaufman et al, Short-term performance of diesel oil and sunflower oil mixtures in diesel engines Farm Research 1982 39(6) 36-43
[3] Aybek, Baser et al, Determination of the effect of biodiesel use on power take-off performance characteristics of an agricultural tractor in a test laboratory 2009, TÜBITAK doi: 10.3906/tar-0907-242
[4] Sivaprakasam et al: Optimization of the transesterification process for biodiesel production and use of biodiesel in a compression ignition engine; Energy and fuels 2007, 21, 2998-3003
[5] Ortech International: Methyl soyate evaluation of various diesel blends in a DDC 6V-92 TA Engine, 1993, 93-E14-21

Example 2

Following the procedure outlined in example 1, but replacing n-hexane and heptane as organic solvent with petroleum diesel, afforded petroleum diesel comprising esterified enriched tall oil. In this example 400 g crude tall oil and 360 g petroleum diesel was used to provide 496 g petroleum diesel comprising esterified enriched tall oil.

As in example 1, the purified enriched oil was evaporated under reduced pressure (0.1 bar) at an elevated temperature not exceeding 80° C. to provide evaporated purified enriched tall oil, with reduced water content. The evaporation did however not result in any significant evaporation of the petroleum diesel used as organic solvent.

The properties of the obtained petroleum diesel comprising esterified enriched tall oil were compared to the ones of the blend of 31 wt % esterified enriched tall oil and 69 wt % petroleum diesel, comprising 5 wt % FAME according to example 1. As can be seen from Table 6, they have similar properties, confirming that use of petroleum diesel as organic solvent is suitable for obtaining a diesel like fuel comprising esterified enriched tall oil.

TABLE 6

| Parameter | Example 1 | Example 2 | Method |
|---|---|---|---|
| Distillation range (95%) | 180-410° C. | 170-410° C. | ASTM D7169 |
| Cetane No | 50 | 57 | EN 15159 |
| Cold filter plugging point | −20° C. | −21° C. | EN 116 |

What is claimed is:

1. An enrichment method for obtaining components for the production of a fuel additive or for the production of a diesel substitute from crude tall oil comprising the steps of:
   providing a quantity of acidic crude tall oil obtained through acidification of black liquor soaps;
   extracting from the quantity acidic crude tall oil, with an organic solvent, lipophilic components comprising fatty acids and diterpenes to obtain an organic extract comprising said lipophilic components;
   washing the organic extract comprising said lipophilic components with sulfuric acid to obtain an acid washed organic extract; and
   washing the acid washed organic extract with water to obtain tall oil enriched in components for obtaining a fuel additive or a diesel substitute.

2. The method according to claim 1, wherein said organic solvent is a C5-C10 linear, branched, or cyclic hydrocarbon.

3. The method according to claim 1, wherein said organic solvent is a C10-C30, linear, branched, or cyclic hydrocarbon, or a mixture thereof.

4. The method according to claim 3, wherein said organic solvent is petroleum diesel.

5. The method according to claim 1, wherein the step of extracting said lipophilic components comprises 1 to 3 extractions with said organic solvent, wherein the obtained organic extracts are combined into a single organic extract comprising extracted lipophilic components.

6. The method according to claim 1, wherein the weight ratio of crude tall oil:organic solvent in said extraction is 2:1 to 1:2.

7. The method according to claim 1, wherein water, in addition to said organic solvent, is added to the crude tall oil in the extraction step.

8. The method according to claim 1, wherein said sulfuric acid comprises at least 90 wt. % $H_2SO_4$.

9. The method according to claim 1, wherein said organic extract is cooled to between 0° C. and 10° C. and filtered before being washed with sulfuric acid.

10. The method according to claim 1, wherein the washing step with water is repeated until water from the washing has a pH of 3 or above.

11. The method according to claim 1, wherein said method further comprises the step of evaporating at least part of the organic solvent and/or at least part of water being present in said tall oil enriched in components for obtaining a fuel additive or a diesel substitute.

12. The method according to claim 1, wherein said method further comprises the step of cooling said tall oil enriched in components for obtaining a fuel additive or diesel substitute to cause precipitation of resin acids and the subsequent removal of precipitated resin acids.

13. A method for obtaining a fuel additive or a diesel substitute from crude tall oil, comprising the steps of:

obtaining tall oil enriched in components for obtaining a fuel additive or a diesel substitute according to the method of claim 1; and esterifying carboxylic acids being present in said tall oil enriched in components for obtaining a fuel additive or a diesel substitute with a C1-3 alkanol to obtain a fuel additive or a diesel substitute.

14. The method according to claim 13, wherein the esterified tall oil enriched in components for obtaining a fuel additive or a diesel substitute is obtained without exposing the tall oil to a temperature above 80° C. in any step.

15. The method according to claim 13, wherein the method is a method for obtaining diesel substitute and wherein the tall oil enriched in components for obtaining a diesel substitute comprises at least part of the organic solvent used to extract the lipophilic components.

16. The method according to claim 15, wherein said organic solvent is a C10-C30, linear, branched or cyclic hydrocarbon, or a mixture thereof.

17. The method according to claim 16, wherein said organic solvent is petroleum diesel.

18. The method according to claim 17, wherein the diesel substitute comprises 10 to 95 wt % of the organic solvent used to extract the lipophilic components.

19. A diesel substitute obtainable by a process according to claim 15.

20. The diesel substitute according to claim 19, wherein said diesel substitute has at least one of the following properties:

a cetane number according to EN 15159 of at least 50 a distillation range according to ASTM D7169, wherein the lower end point of the distillation range is in the interval 160-190° C. and the upper end point of the distillation range is in the interval 380 to 420° C.;

a cold filter clogging point according to EN 116 of −20° C. or less.

* * * * *